United States Patent
Resnick

[15] 3,692,843
[45] Sept. 19, 1972

[54] PERFLUOROVINYL ETHERS
[72] Inventor: Paul Raphael Resnick, Wilmington, Del.
[73] Assignee: E. I. du Pont de Nemours and Company, Wilmington, Del.
[22] Filed: March 29, 1971
[21] Appl. No.: 129,176

[52] U.S. Cl.................260/615 A, 252/54, 260/615 P
[51] Int. Cl..............................................C07c 43/00
[58] Field of Search.......260/615 A, 615 BF; 252/54, 252/52 N

[56] References Cited

UNITED STATES PATENTS

| | | | |
|---|---|---|---|
| 2,732,370 | 1/1956 | Codding | 260/615 P |
| 2,856,435 | 10/1958 | Lo | 260/657 X |
| 3,291,843 | 12/1966 | Fritz et al. | 260/614 F |
| 3,321,532 | 5/1967 | Lorenz | 260/6.5 BF X |
| 3,564,059 | 2/1971 | Sianesi | 260/6.5 A |

Primary Examiner—Howard T. Mars
Attorney—Edwin Tocker

[57] ABSTRACT

Compounds of the formula $CF_3O(CF_2O)_nCF_2CF_2OCF=CF_2$, wherein $n$ is 1 to 5, are provided by reacting compounds of the formula $CF_3O(CF_2O)_nCF_2COF$ with hexafluoropropylene epoxide, followed by dehalocarbonylation. The compounds of this invention are polymerizable to polymers which are useful as thermally stable oils and greases.

3 Claims, No Drawings

PERFLUOROVINYL ETHERS

This invention relates to fluorocarbon vinyl ethers of the formula $CF_3O(CF_2O)_{1-5}CF_2CF_2OCF=CF_2$.

Fluorocarbon vinyl ethers of the formula $R-O-CF=CF_2$, wherein R is a perfluoroalkyl group, are disclosed in U.S. Pat. No. 3,132,123 to Harris et al. Fluorocarbon vinyl ethers of the formula $RCF_2-O-CF=CF_2$, wherein R has the same meaning as above, are disclosed in U.S. Pat. No. 3,114,778 to Fritz et al. Additional fluorocarbon vinyl ethers, of the formula $CF_3CF_2(OCF_2CF_2)_nOCF=CF_2$, wherein $n$ is at least 1, are disclosed in U.S. Pat. No. 3,450,684 to Darby. Additional examples of vinyl ethers are disclosed in U.S. Pat. Nos. 3,250,808 and 3,321,532 to Moore et al. and Lorenz, respectively.

The present invention provides still another group of fluorocarbon vinyl ethers, namely, of the formula $CF_3O(CF_2O)_nCF_2CF_2OCF=CF_2$, wherein $n$ is an integer of 1 to 5 inclusive. Thus, the compounds of this invention are as follows:

$$CF_3OCF_2OCF_2CF_2OCF=CF_2,$$

$$CF_3O(CF_2O)_2CF_2CF_2OCF=CF_2,$$

$$CF_3O(CF_2O)_3CF_2CF_2OCF=CF_2,$$

$$CF_3O(CF_2O)_4CF_2CF_2OCF=CF_2,$$

$$CF_3O(CF_2O)_5CF_2CF_2OCF=CF_2.$$

The compounds of the present invention can be prepared by reacting acyl fluorides of the formula $CF_3O(CF_2O)_nCF_2COF$, wherein $n$ has the same meaning as above, with hexafluoropropylene epoxide (oxide) using for example the conditions disclosed in the aforementioned Fritz et al. patent. Briefly, the reaction is carried out with about equimolar quantities of reactants in a polar solvent such as dimethyl ether of ethylene glycol or benzonitrile, containing a fluoride catalyst such as KF or CsF, at a temperature in the range of $-30°$ to $100°$ C.

The acyl fluoride starting material can be prepared by the low temperature oxidation of tetrafluoroethylene in the presence of ultra violet radiation as disclosed in British Pat. No. 1,097,679 or by electrochemical fluorination of the hydrocarbon carboxylic acid analog, and the hexafluoropropylene epoxide starting material can be prepared by the alkaline hydrogen peroxide oxidation of hexafluoropropylene as disclosed in U.S. Pat. No. 3,358,003 to Eleuterio et al. or by the oxidation processes disclosed in Canadian Pat. Nos. 691,974 and 832,469.

The product of the reaction between the acyl fluoride and hexafluoropropylene epoxide is a compound of the formula $CF_3O(CF_2O)_nCF_2CF_2OCF(CF_3)COF$, wherein $n$ has the same identity as the starting acyl fluoride. This product can be converted to the corresponding vinyl ether compound of the present invention by the pyrolysis process disclosed in the aforementioned Fritz et al. patent. Briefly, the pyrolysis can be conducted by passing the reaction product in gaseous form through a reaction zone maintained at an elevated temperature of from 300° to 600° C., wherein the reaction product contacts an alkali metal compound followed by removing the compound of this invention as a gaseous effluent from the reaction zone. A preferred gaseous pyrolysis procedure is disclosed in U.S. Pat. No. 3,291,843 to Fritz and Selman in which the pyrolysis temperature is from 200° to 300° C. and the alkali metal compound is $Na_2CO_3$. Alternatively, the liquid phase pyrolysis procedure described in the Fritz and Selman patent can be used, wherein the epoxide-acyl fluoride reaction product and alkali metal compound such as $NA_2CO_3$ are contained in a polar organic liquid such as a dialkyl ether of ethylene glycol. The sodium salt of the reaction product can be formed by room temperature stirring, and this is followed by heating typically at temperature of from 75° to 160° C. to form the desired vinyl ether.

The resultant fluorocarbon vinyl ethers, $CF_3O(CF_2O)_{1-5}CF_2CF_2OCF=CF_2$, of this invention are liquids having a boiling point in excess of 60° C. at standard temperature and pressure.

The fluorocarbon vinyl ethers of this invention can be polymerized to form thermally stable oils and greases which are useful as such in high temperature lubrication applications. Typically, the polymer will withstand prolonged exposure at temperatures in excess of 150° C. and even in excess of 200° C. without degradation.

The polymerization can be carried out by conventional procedures involving for example exposing a solution of the vinyl ether or the vinyl ether in bulk to a source of free radicals generated by irradiation of the solution or by free-radical initiator added to the solution. The resultant polymer contains recurring units of the formula

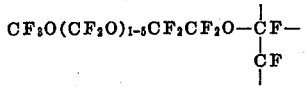

The preparation of compounds of this invention is further illustrated by the following examples in which parts and percents are by weight unless otherwise indicated:

EXAMPLE 1

Preparation of

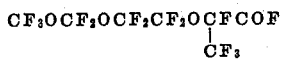

(Perfluoro-2-Methyl-3,6,8-Trioxanonanoyl Fluoride).

A 500 ml three-necked, round bottom flask was charged with 5 g cesium fluoride, 75 ml diethylene glycol dimethyl ether, and 54 g of a mixture of 87 percent perfluoro-3,5-dioxahexanoyl fluoride and 13 percent 1,1,2-trichloro-1,2,2-trifluoroethane. After stirring for 30 minutes, 25 g of hexafluoropropylene oxide was added, causing an exothermic reaction which increased the temperature of the reaction mixture from 15° to 35° C. The reaction mixture was then cooled, the lower layer separated and distilled to give 33.3 g of perfluoro-2-methyl-3,6,8-trioxanananoyl fluoride boiling at 88°–89° C. The infrared spectrum of this material which showed a band due to —COF at 5.31 microns was consistent with this structure. A small portion of the acyl fluoride was converted to the corresponding methyl ester upon treatment with methanol. The mass spectrum and NMR spectrum of the product, b.p. 134° C., was consistent with the methyl perfluoro-2-methyl-3,6,8-trioxanonanoate structure. Elemental analysis showed carbon 22.50 percent; hydrogen 0.71 percent.

PREPARATION OF $CF_3OCF_2OCF_2CF_2OCF=CF_2$

Perfluoro-3,5-Dioxahexylvinyl Ether)

A 300 ml three-necked, round bottom flask was charged with 16.9 g of anhydrous sodium carbonate and 75 ml of anhydrous diethylene glycol dimethyl ether. To the stirred reaction mixture was added 33.3 g of perfluoro-2-methyl-3,6,8-trioxanonanoyl fluoride. The reaction mixture was stirred for one hour at room temperature and then heated to about 120° C. to give a distillate boiling point 66° C. (the distillate is primarily the desired vinyl ether which distills off as it is formed from the sodium salt). The distillate was washed with water and dried with anhydrous sodium sulfate to give 23.8 g (85.3 percent) of perfluoro-3,5-dioxahexylvinyl ether. The infrared spectrum of this material which showed a band due to the $CF_2=CF-O$ group at 5.45 microns was consistent with this structure. The vinyl ether was brominated to give perfluoro-3,5-dioxahexyl-1,2-dibromoethyl ether, b.p. 134° C., whose structure was confirmed by NMR and IR spectroscopy.

EXAMPLE 2

Preparation of

(Perfluoro-2-Methyl-3,6,8,10,12-Pentaoxatridecanoyl Fluoride)

A 500 ml three-necked, round bottom flask was charged with 5 g cesium fluoride, 75 ml. diethylene glycol dimethyl ether and 70.5 g of perfluoro-3,5,7,9-tetraoxadecanoyl fluroide. The reaction mixture was stirred and 29 g of hexafluoropropylene oxide added at 30° ± 2°. The reaction mixture was stirred for about 30 minutes and the lower layer separated and distilled to give 45.1 g (47.5 percent) of perfluoro-2-methyl-3,6,8,10,12-pentaoxatridecanoyl fluoride, b.p. 132°–3° C. The infrared spectrum of this material was consistent with this structure.

PREPARATION OF $CF_3OCF_2OCF_2OCF_2OCF_2CF_2$ $OCF=CF_2$ (Perfluoro-3,5,7,9-Tetraoxadecylvinyl Ether)

A 300 ml three-necked, round bottom flask was charged with 17.5 g of anhydrous sodium carbonate and 75 ml of anhydrous diethylene glycol dimethyl ether. To the stirred reaction mixture was added 45.1 g of perfluoro-2-methyl-3,6,8,10,12-pentaoxatridecanoyl fluoride. The reaction mixture was stirred for 16 hours at room temperature and then heated (to about 120° C.) to give a distillate, b.p. 107°.The distillate was washed with water, dried with calcium chloride and redistilled to give pure perfluoro-3,5,7,9-tetraoxadecylvinyl ether, b.p. 107° C. The I.R., NMR and mass spectra were consistent with this structure. Bromination yielded the corresponding dibromide, perfluoro-3,5,7,9-tetraoxadecyl-1,2-dibromoethyl ether, whose structure was confirmed by I.R. and NMR spectroscopy.

EXAMPLE 3

Preparation of

(Perfluoro-2-Methyl-3,6,8,10,12,14-Hexaoxapentadecanoyl Fluroide)

To a 500 ml three-necked, round bottom flask was charged with 4 g cesium fluoride, 150 ml diethylene glycol dimethyl ether, 31.5 g of perfluoro-3,5,7,9,11-pentaoxadodecanoyl fluoride, and 12.0 g of hexafluoropropylene oxide. The reaction medium was stirred for one hour during which time an exothermic reaction took place raising the temperature of the medium to 39° C. The lower layer of the medium was recovered and it contained 26.4 g of perfluoro-2-methyl-3,6,8,10,12,14-hexaoxapentadecanoyl fluoride.

PREPARATION OF $CF_3OCF_2OCF_2OCF_2OCF_2$ $CF_2OCF=CF_2$ (Perfluoro-3,5,7,9,11-Pentaoxadodecylvinyl Ether)

A 300 ml three-necked, round bottom flask was charged with 10.6 g anhydrous sodium carbonate and 100 ml diethylene glycol dimethyl ether. To the stirred reaction mixture was added 26.4 g perfluoro-2-methyl-3,6,8,10,12,14-hexaoxapentadecanoyl fluoride. The reaction mixture was stirred at room temperature for 16 hours and then heated to about 120° C. to give a colorless distillate containing two layers. This was washed with water and 5 percent sodium bicarbonate solution and dried to give 16.9 g of crude product. Distillation gave 4.6 g of a center cut, b.p. 112° C., identified as perfluoro-3,5,7,9,11-pentaoxadodecylvinyl ether. The I.R. spectrum of this material was consistent with this structure. Bromination yielded the corresponding dibromide perfluoro-3,5,7,9,11-pentaoxadodecyl-1,2-debromoethyl ether, whose structure was confirmed by NMR spectoroscopy.

EXAMPLE 4

POLYMERIZATION OF $CF_3OCF_2OCF_2CF_2OCF=CF_2$ (Perfluoro-3,5-Dioxahexylvinyl Ether)

A sealed 6 mm diameter quartz tube containing 1.165 g of perfluoro-3,5-dioxahexyl vinyl ether was irradiated for 329 hours using 8 RUL–2537A lamps (available from The Southern New England Ultraviolet Company). The product was a clear viscous liquid (oil), soluble in Freon C–51–12 (a mixture of perfluorodimethyl cyclobutane isomers with the 1,2-isomer predominating) whose infrared spectrum was consistent with a low molecular weight polymer of perfluoro-3,5-dioxahexylvinyl ether.

Similar procedures can be used to prepare other vinyl ethers of the present invention and to polymerize other vinyl ethers to higher molecular weight oils and greases.

As many apparently widely different embodiments of this invention may be made without departing from the spirit and scope thereof, it is to be understood that this invention is not limited to the specific embodiments thereof except as defined in the appended claims.

I claim:

1. Compounds of the formula $CF_3O(CF_2O)_n CF_2CF_2OCF=CF_2$ wherein $n$ is an integer of 1 to 5.
2. The compound of claim 1 wherein $n = 1$.
3. The compound of claim 1 wherein $n = 2$.

* * * * *